US007016944B1

(12) United States Patent
Meyer et al.

(10) Patent No.: US 7,016,944 B1
(45) Date of Patent: Mar. 21, 2006

(54) SYSTEM AND METHOD FOR PASSIVE DETECTION AND CONTEXT SENSITIVE NOTIFICATION OF UPGRADE AVAILABILITY FOR COMPUTER INFORMATION

(75) Inventors: Gordon R. Meyer, San Jose, CA (US); Albert R. Howard, Jr., Fremont, CA (US); Wayne Loofbourrow, Sunnyvale, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/409,065

(22) Filed: Sep. 30, 1999

(51) Int. Cl.
 *G06F 15/16* (2006.01)
 *G06F 9/44* (2006.01)
 *G06F 9/445* (2006.01)

(52) U.S. Cl. ...................... 709/218; 717/172; 717/177
(58) Field of Classification Search ................ 709/224, 709/218, 221; 345/810; 714/38; 717/168, 717/171, 172, 173
See application file for complete search history.

(56) References Cited

U.S. PATENT DOCUMENTS

| | | | | |
|---|---|---|---|---|
| 5,140,677 A | * | 8/1992 | Fleming et al. ............. 345/835 |
| 5,408,655 A | | 4/1995 | Oren et al. |
| 5,630,117 A | | 5/1997 | Oren et al. |
| 5,732,275 A | | 3/1998 | Kullick et al. |
| 5,764,992 A | | 6/1998 | Kullick et al. |
| 5,781,904 A | | 7/1998 | Oren et al. |
| 5,790,796 A | * | 8/1998 | Sadowsky .................. 709/221 |
| 5,974,454 A | * | 10/1999 | Apfel et al. ................ 709/221 |
| 6,006,034 A | * | 12/1999 | Heath et al. ................ 717/170 |
| 6,035,423 A | * | 3/2000 | Hodges et al. ............... 714/38 |
| 6,049,671 A | * | 4/2000 | Slivka et al. ............... 717/173 |
| 6,151,708 A | * | 11/2000 | Pedrizetti et al. ........... 717/173 |
| 6,199,204 B1 | * | 3/2001 | Donohue ..................... 717/11 |
| 6,223,188 B1 | * | 4/2001 | Albers et al. ............... 707/501 |
| 6,282,709 B1 | * | 8/2001 | Reha et al. ................... 717/11 |
| 6,353,926 B1 | * | 3/2002 | Parthesarathy et al. ....... 717/11 |

OTHER PUBLICATIONS

Leach, "Give your Computer a Complete Physical Using Oil Change", pp. 11-12, Info Tech Update, Jun. 1997.*
Peschel, "Lubricate Your System with Oil Change", p. 93, Info World, Dec. 1996.*
Law Office Computing, "Oil Change", Sep. 1999.*
Johnston, Easier Software Updates, Information Week, Jun. 1996.*

* cited by examiner

*Primary Examiner*—Larry D. Donaghue
(74) *Attorney, Agent, or Firm*—Buchanan Ingersoll PC

(57) ABSTRACT

The present invention is a system and method that monitors upgrade availability for computer information on a user's computer and allows the user to determine which of the available upgrades will be downloaded to the user's computer and installed. The upgrade availability for computer information on the user's computer is monitored in the background, without user-intervention when the user connects to a network, such as the Internet. If any such upgrades are available, a flag is set to notify the user of such upgrades. The user is notified of any available upgrades when computer information is accessed for which an upgrade is available, and given a choice of whether or not to download the available upgrade(s). The downloaded upgrade(s) may then be installed by an installation means. In this manner, the present invention allows for the user to download only those upgrades desired by the user.

68 Claims, 5 Drawing Sheets

SYSTEM AND METHOD FOR PASSIVE DETECTION AND CONTEXT SENSITIVE NOTIFICATION OF UPGRADE AVAILABILITY FOR COMPUTER INFORMATION

FIELD OF THE INVENTION

The present invention relates generally to computer information upgrades, in particular, to upgrading computer information on a user's computer from a remote server.

BACKGROUND OF THE INVENTION

One of the primary factors that contributes to the value of a computer is its ability to perform a wide range of useful, often unrelated functions. Each of these functions utilizes some type of computer information. Over time, modifications are typically made to the various types of computer information and updated versions of the information are made available by a provider company. Many types of computer information need frequent upgrades to maintain the most recent version on a user's system. Whether it be a computer program, such as an executable program or an application, or an informational file, such as a database or help file, the need to upgrade the information is crucial to keeping a computer system current, and thereby maintain the overall value of the computer system.

Traditionally such information has been transferred in the form of upgrade computer disks or CD-ROMs. Three main disadvantages in transferring upgrade information using disks or CD-ROMs are speed, expense, and convenience. Because these types of upgrades are slow to reach the user and expensive for a company to send, many computer systems may not have the most up-to-date computer information on the user's computer system. Upgrading in this manner is also inconvenient for a user because the user often must determine which version of the software is on the user's system and whether or not the upgrade is necessary.

In network environments, it is possible to send an electronic mail message to all users on the network to inform them that an upgrade is available. In this case, however, the individual users are required to download and install the upgrade themselves, when and if the upgrade is desired. For those users who are not familiar with the procedures necessary to retrieve and/or install the upgrade, the installation may end up being faulty, inadequate, or delinquent. In such situations, support from a network administrator or the like may be required. Consequently, uniform and timely upgrades to any large number of users can be difficult or impossible to achieve. In such a network environment, the problems of cost and convenience still persist.

Even where automated upgrade mechanisms have been made available in the past, they were limited to network-based independent programs that attempted to affect changes to software modules that were identified by a network administrator, based on a set of rules. To be effective, these approaches required significant maintenance of the rule set by the administrator, adding complexity and overhead to the process. In addition, since these operations were external to the software being updated, they required interruption of the operation of the software before the updating could take place. The user often had no control over when an update occurred. Furthermore, since they exerted external control, security issues were raised. For example, an active operation that has access to a large number of computers, such as an external updating program, provides a path by which a virus or a hacker can invade the computer system.

With the advent of the Internet, the problem of speed has been reduced by providing upgrades, including large ones, within a relatively short time period as compared to the time required to mail an upgrade. However, downloading upgrade information over the Internet presents other problems. For example, it may not be convenient for a user to search for upgrades online and use a significant portion of available bandwidth to download such information. Additionally, unfamiliarity with the procedures necessary to retrieve and/or install upgrades over the Internet may still exist.

To allow users to determine if the user's computer has the latest version of a particular product, many programs have implemented the Simple Internet Version Checking (SIVC) protocol. However, these programs offer little help for users in determining how and where to obtain such upgrades and, for inexperienced users, installation may still be a problem. These programs also have a disadvantage in that they rely on a server to receive a version report and then must process the version report to determine if an update is available. Problems with a server's version information may cause faulty availability information in the availability report.

With many different forms of computer information residing on a user's computer, it becomes increasingly difficult to monitor upgrade information for all such computer information. In addition to the many different forms of computer information present on a user's computer, it is common to have certain types of information which need to be updated frequently. One such type of information that may require frequent updates is a help file. The help files on a computer may contain information that relates to every program on the computer. As a result, with any changes to application programs or operating system, the corresponding help files must be updated to reflect changes in the help suggestions relating to any changed applications. Also, various recommendations in the help files may be modified over time, requiring the help files to be upgraded to reflect such modifications. All of this updating can become burdensome for a user to monitor, making it difficult for the user to maintain a computer system's information current.

Accordingly, it is desirable to create a system that will automatically monitor and upgrade information and alert the user to the presence of any upgrades available for computer information on the user's computer. It is also desirable to allow the user to determine which of the available upgrades will be downloaded to the user's computer and installed.

SUMMARY OF THE PRESENT INVENTION

In accordance with the present invention, these objectives are achieved by a system and method that monitors upgrade availability for computer information on a user's computer and allows the user to determine which of the available upgrades will be downloaded to the user's computer and installed. The upgrade availability for computer information on the user's computer is monitored in the background, without user intervention when the user connects to a network, such as the Internet. If any such upgrades are available, a flag is set to notify the user of such upgrades. The user is notified of any available upgrades when computer information is accessed for which an upgrade is available, and given a choice of whether or not to download the available upgrade(s). The downloaded upgrade(s) may then be installed by an installation means. In this manner, the present invention allows the user to selectively download only those upgrades desired by the user. Through the use of the present invention, problems with cost, speed, and convenience of upgrading computer information can be avoided by automatically determining upgrade availability and notifying the user, and allowing the user to ultimately control what upgrades will be installed on the user's computer.

Further features of the invention, and the advantages offered thereby, are explained in greater detail hereinafter with reference to specific embodiments illustrated in the accompanying drawings.

DETAILED DESCRIPTION OF PREFERRED EMBODIMENTS

To facilitate an understanding of the principles and features of the present invention, it is explained hereinafter with reference to its implementation in an illustrative embodiment. In particular, the invention is described in the context of an upgrade system for upgrading help files via the Internet, specifically HTML-based "books" for use in the Apple Help® system on the Macintosh® operating system (Mac OS) developed by Apple Computer, Inc. It will be appreciated however that this is not the only embodiment in which the invention can be implemented. Rather, it can find utility in a variety of computer configurations, as will become apparent from an understanding of the principles which underscore the invention.

Figure 1:
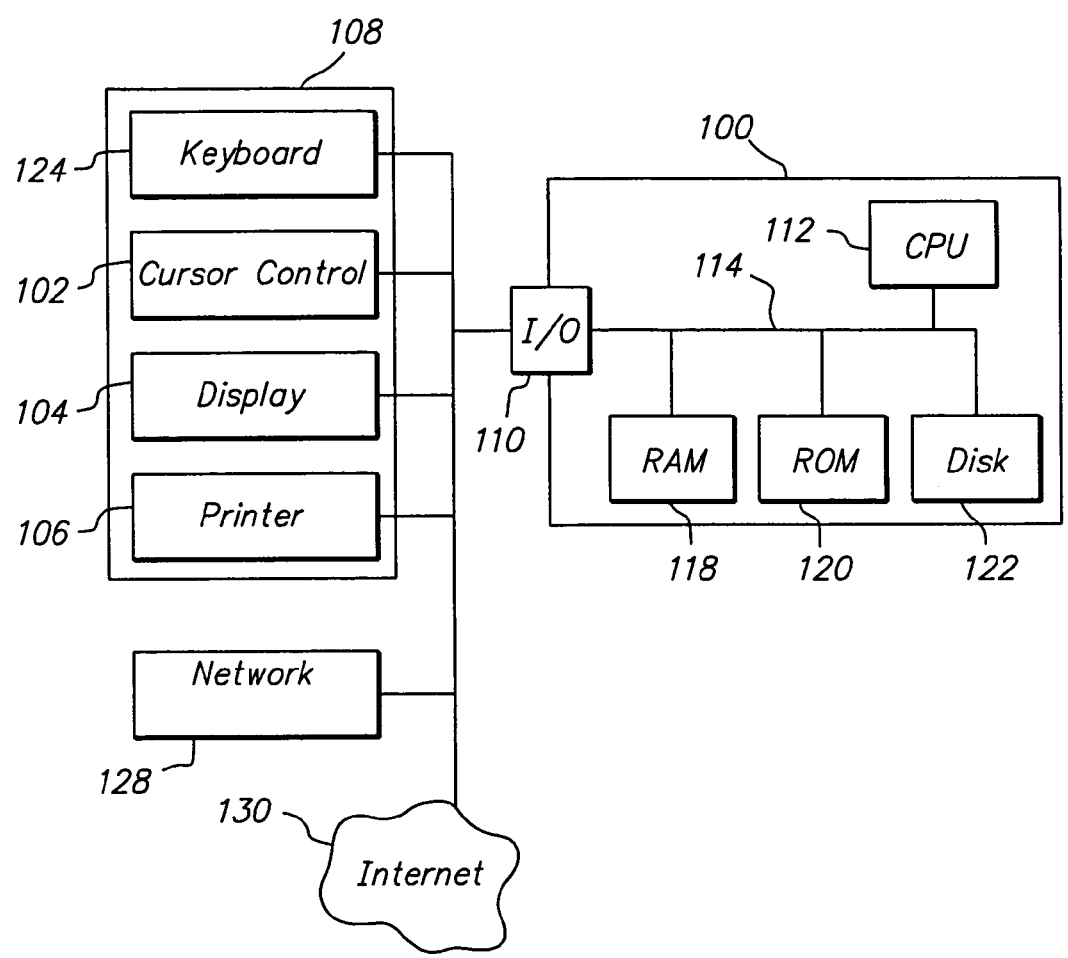
FIG. 1 is an exemplary computer system in which the system and method of the present invention may be employed.

An exemplary computer system of the type in which the present invention can be employed is illustrated in block diagram form in FIG. 1. The structure of the computer itself does not form part of the present invention. It is briefly described here for subsequent understanding of the manner in which the features of the invention cooperate with the structure of the computer.

Referring to FIG. 1, the system includes a computer 100 having a variety of external peripheral devices 108 connected thereto. The computer 100 includes a central processing unit 112, a main memory which is typically implemented in the form of a random access memory 118, a static memory that can comprise a read only memory 120, and a permanent storage device, such as a magnetic or optical disk 122. The CPU 112 communicates with each of these forms of memory through an internal bus 114. The peripheral devices 108 include a data entry device such as a keyboard 124, and a pointing or cursor control device 102 such as a mouse, trackball or the like. A display device 104, such as a CRT monitor or an LCD screen, provides a visual display of the information that is being processed within the computer, for example the contents of a document. A hard copy of this information can be provided through a printer 106, or similar device. Each of these external peripheral devices communicates with the CPU 112 by means of one or more input/output ports 110 on the computer. Input/output ports 110 also allow computer 100 to interact with a local area network server or an external network 128, such as a LAN or WAN, or the Internet 130.

Computer 100 typically includes an operating system, which controls the allocation and usage of the hardware resources such as memory, central processing unit time, disk space, and peripheral devices. In addition to an operating system, computer 100 may also include a of help mechanism that provides the user with computer-aided assistance. Although described separately herein, the help system could reside as a component of the operating system or could be stored on any type of machine-readable medium, such as disk 122. Additionally, computer 100 also includes an automatic help system updating system, which may reside as a component of the operating system or could be stored in memory or on any type of machine-readable medium, such as disk 122. The automatic help system is further described herein in connection with one of the preferred embodiments of the present invention.

Figure 2:
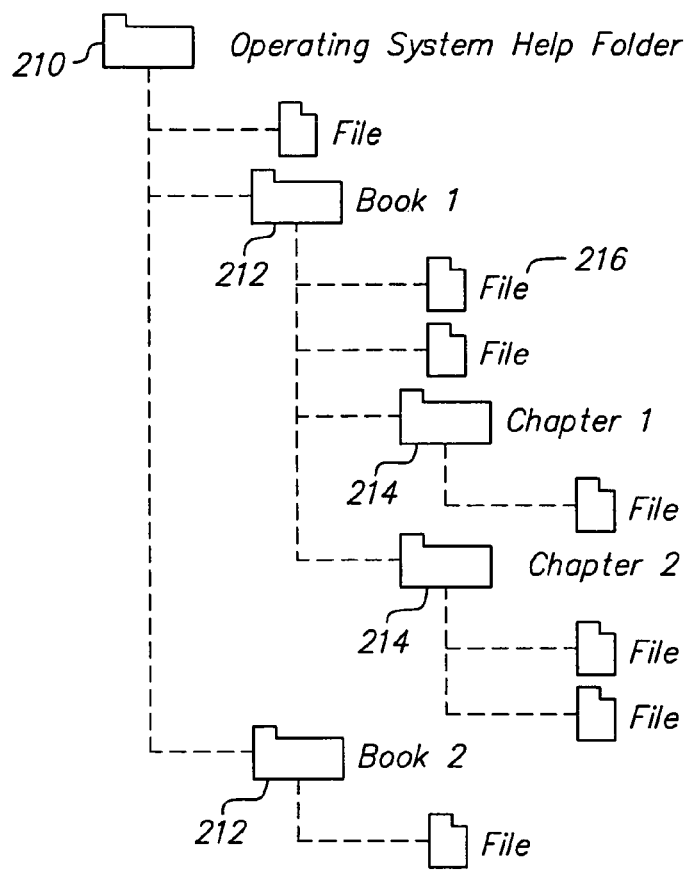
FIG. 2 is a diagram of a help system, which the present invention may be utilized to update.

The layout of the help system, according to an exemplary embodiment of the present invention, is set forth in FIG. 2. As is evident from FIG. 2, the layout of the help system is hierarchical and includes a number of folders, sub-folders and files. An operating system help folder 210 is the centralized folder in which the help information for the computer system is stored.

In the illustrated embodiment of the present invention, folders 212 which are one level deep within the operating system help folder are referred to as "books." While the operating system help folder in FIG. 2 comprises only two books 212, one skilled in the art will recognize that the help folder could comprise any number of books. The individual books 212 of the present invention include files and may also include sub-folders 214. The sub-folders 214, which are those folders two levels deep within the operating system help folder, are referred to hereinafter as "chapters." As recognized by those skilled in the art, the chapters contain files and may contain additional sub-folders.

Figure 3:
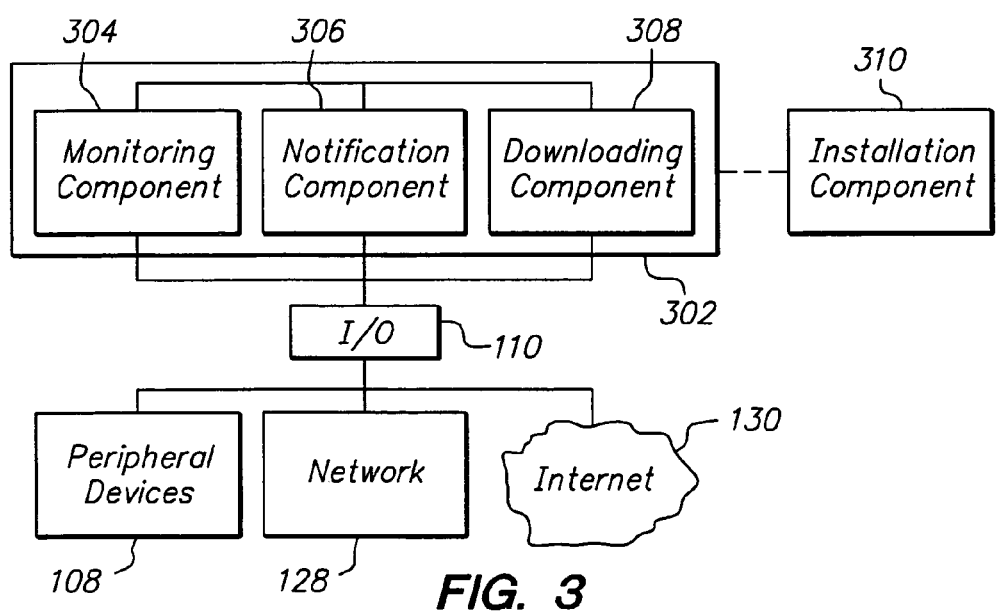
FIG. 3 is a diagram of the basic components of the system of the present invention.

FIG. 3 shows the basic components of an upgrade system 302 for upgrading a help system, and the interconnectivity of these components with each other and other devices. Contained within the upgrade system is a monitoring component 304 for monitoring the availability of upgrades for the help system, a notification component 306 for notifying a user of the availability of an upgrade for the help system, and a downloading component 308 for downloading any upgrades available for the help system, pursuant to a user's approval. The upgrade system is optionally connected to an installation component 310, as shown by the broken line in FIG. 3, for installation of any upgrades available for the help system after the upgrades are downloaded using the downloading component. Alternatively, the installation component may be included as part of the upgraded information itself. The monitoring component 304, notification component 306 and downloading component, are all interconnected within the upgrade system, and are all externally connected to I/O ports 110, which may be connected to peripheral devices 108, the Internet 130, or a network 128 such as a LAN, WAN, or other type of network.

Figure 4:
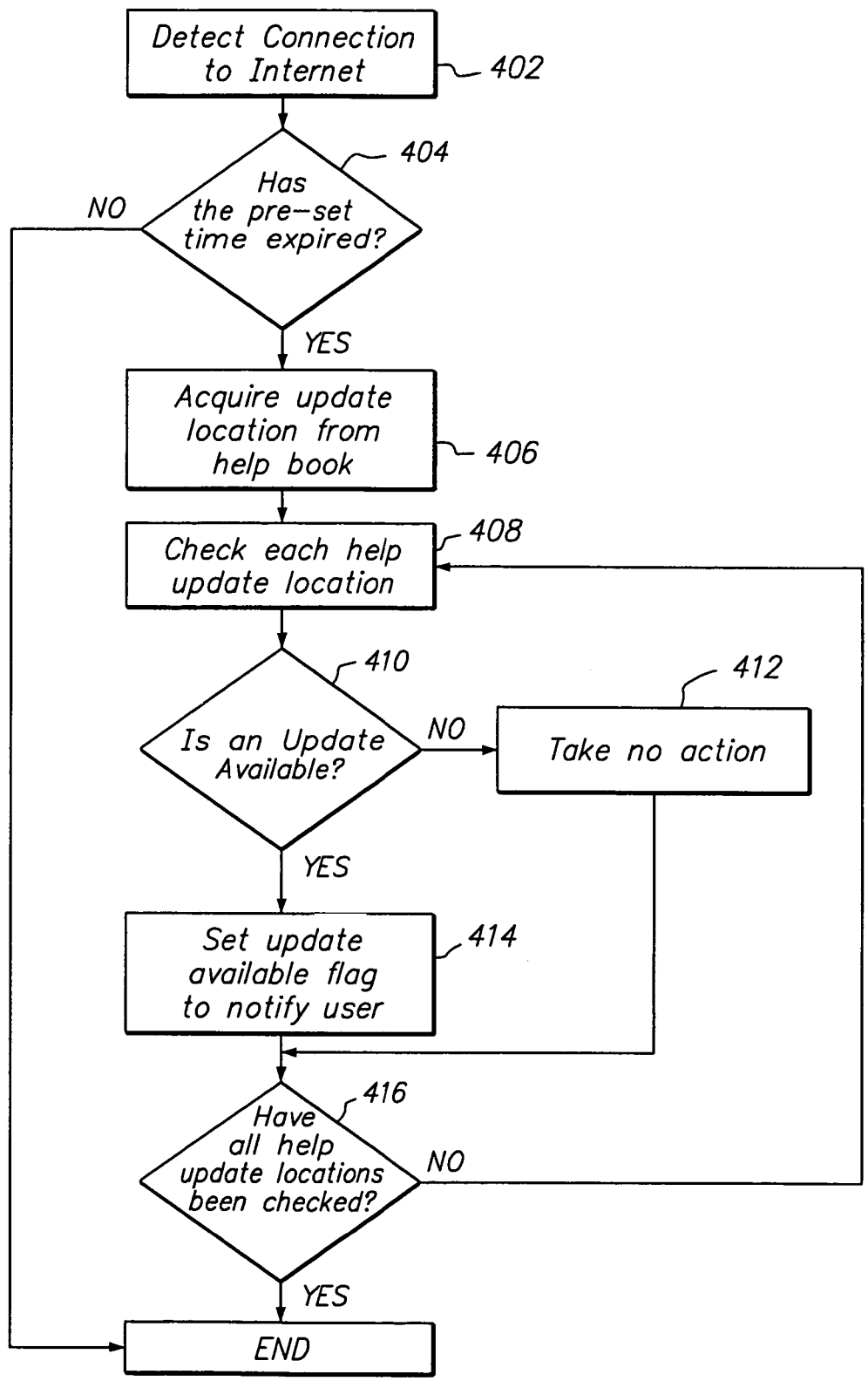
FIG. 4 is a flowchart of the method performed by the monitoring component.

With that brief overview of the layout of the upgrade system, the operation of the monitoring component 304 of the upgrade system 302 is now described with reference to FIG. 4. In monitoring the availability of upgrades for the help system, the monitoring component determines if the user is currently connected to the Internet at step 402. The monitoring component then determines if a pre-set time limit, since the last time that the monitoring operation was carried out, has expired at step 404. If the pre-set time limit has expired, then the system acquires an update location from the help book at step 406. Each help book includes a designated file 216 that indicates a location where updates to the book will be made available. For example, the location may be in the form of a universal resource locator (URL) that consists of a server and file path. For example, http://help.xyzcorp.com/oshelp/version10/ is the help update location for the book on operating system Help, version 1.0. Upon acquiring available update locations, the upgrade system checks each help update location, indicated in the associated files of the help books, at step 408.

When the user is connected to the Internet, the monitoring component checks each help update location acquired from the help book at step 408 and ascertains whether or not an update is available 410. If an update is available, an update available flag is set at step 414 to notify the user of the existence of an available update. The determination of update availability may be based on a location being empty or another determination such as a file date or version number. As each location is checked, various aspects of the updates at each location may be examined by the monitoring component. For example, the monitoring component may check file date, file version number, file size, or estimated download time.

The monitoring component performs these checks until all of the help update locations have been checked. After all of the help update locations have been checked, the monitoring component may be programmed to wait a predetermined time period, such as 48 hours, before checking for available updates again, or may wait a time period programmed by the user through an options menu, or the like, as depicted at step 404. These checks may occur either with user supervision, or as a background process, which may not be known to the user. In a preferred embodiment of the present invention, all functions of the monitoring component of the upgrade system are performed without user knowledge or intervention to provide automatic and convenient update checking.

In the embodiment of the present invention described above and depicted in FIG. 4, the establishment of a connection to the Internet is the triggering event used by the monitoring component to determine if an update is available. Alternatively, another event may be used to trigger the monitoring component to search for available updates. One such triggering event may be starting a program. In this alternate embodiment, the monitoring component may be programmed to establish a connection to an external network, such as the Internet, and search for updates. The updates that are searched for by the monitoring component may include updates associated with the triggering program or another program. After the triggering event, starting a program, has occurred, the monitoring component functions as described above in connection with FIG. 4, searching for available updates and setting flags to notify the user of available updates.

The operation of the upgrade system is further described with reference to FIG. 5, which outlines the operation of the notification and downloading components 306, 308. Once the monitoring component has determined that an update is available, and has flagged the update with an update availability flag, user notification may take place in a variety of manners. For example, the user may be notified immediately, or at a pre-determined interval, which could be set by a user, of the availability of any such updates. Notification may also be reserved until the computer information, for which the update is available, is accessed by the user. In the preferred embodiment of the invention described herein, notification takes place only when a user opens the help book for which an update has been flagged by the monitoring component. This notification is displayed to the user on the computer display 104. A user option may be available through a pull-down menu, or otherwise, for the user to ignore update notifications, or specify a wait period after being notified of available updates, to expire before receiving more notifications of available upgrades.

Figure 5:
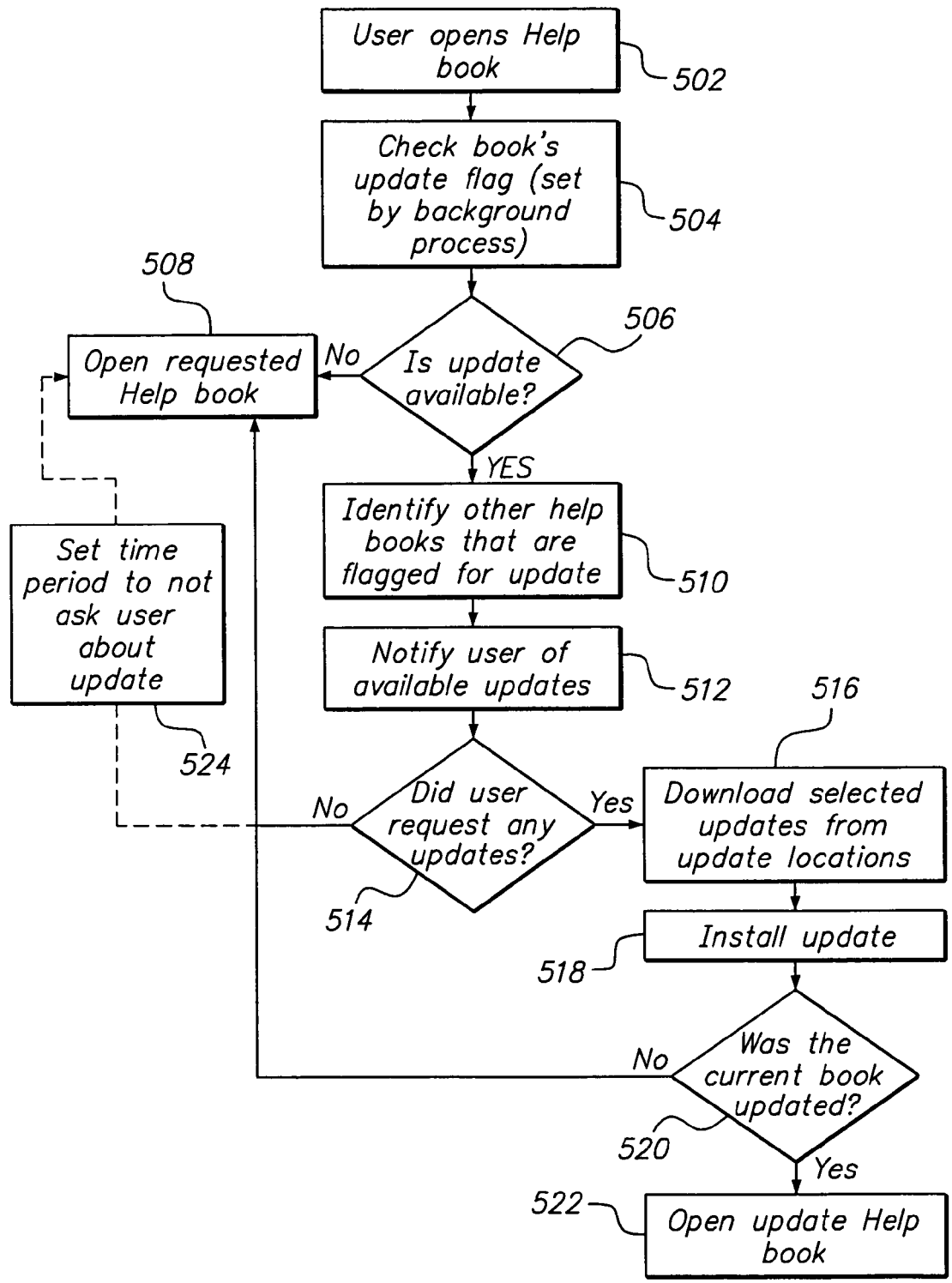
FIG. 5 is a flowchart of the method performed by the notification and downloading component.

Each time a user opens a help book, as shown at step 502 in FIG. 5, the help system may be programmed to check the book's update flag at step 504. If the flag indicates that an update is not available at step 506, then the help book is opened at step 508, as requested. If, however, a flag exists indicating that an update is available, then the invention may identify flags for other help books at step 510, which indicate the availability of upgrades for the other help books, and notifies the user of all available updates at step 512. The user may request an update, which is detected at step 514, in which case the invention downloads the selected updates from their locations at step 516 and installs them at step 518 by means of an installer which accompanies the updated information, or an outside executable program, which may be inherent to the operating system. The installation replaces some or all of the pages in the help book, and also provides a new update location file 216. For example, the previously described location might be replaced with a new update location such as http://help.xyzcorp.com/oshelp/version11/. Once the installation of an updated help book has taken place, the requested help book is opened at step 522. Alternatively, if the user does not request any updates, the requested help book is simply opened at step 508.

As shown by the broken line in FIG. 5, a time period may be set as step 524, during which the user will not be notified of existing updates again to prevent inconvenient, multiple notifications of the same updates. This period could be a specific session, or for a specific amount of time, and could be set or overridden using a menu option, such as a "check for updates" menu option, which would force the monitoring and notification components to perform their functions immediately. An override function may be available to the user to allow the user to override the notification component, disabling all update notifications. Additionally, as new updates become available, new download locations are specified from which the system may download the updates, pursuant to the user's instruction. During download, the downloading component may be configured to display real-time downloading options such as: download statistics, download time, and file identification information. The user may further be presented with the option to cancel a download during the download.

Figure 6:
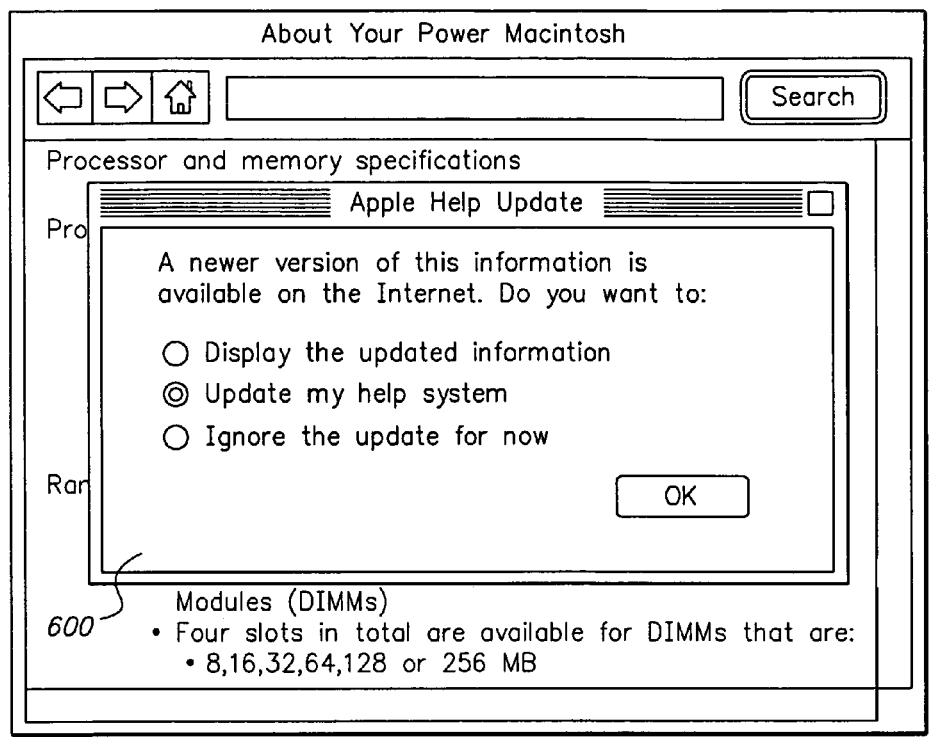
FIG. 6 is an exemplary user-notification window.
Figure 7:
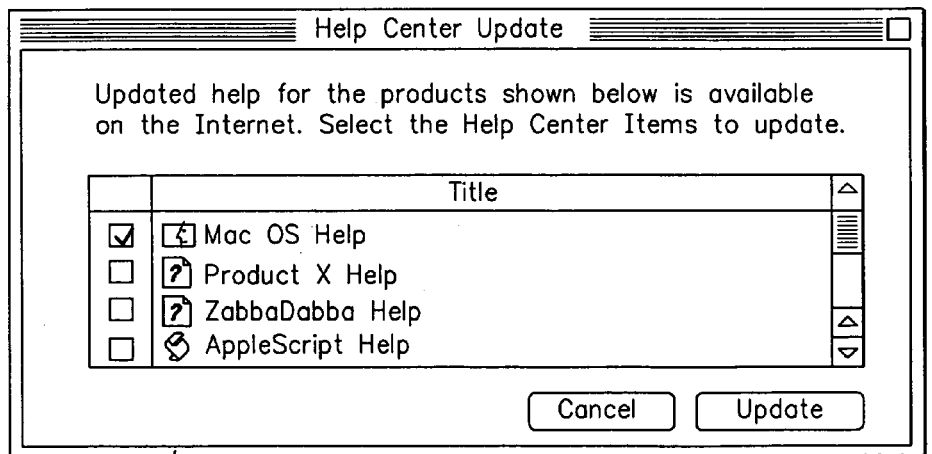
FIG. 7 is an exemplary user dialog window with download options.

FIGS. 6 and 7 show the display presented to the user by the notification module. In FIG. 6, the user is notified by way of a notification window 600 of the availability of an update and given the choice to display updated information, update the help system, or ignore the update temporarily. In FIG. 7, the user is shown all of the possible updates by way of a notification window 700, which have been flagged by the monitoring component, and given a choice of which to update. The user is allowed to select any of the available updates for downloading.

From the foregoing, it can be seen that the present invention provides a system and method for monitoring the availability of upgrades to computer information on a user's computer. This upgrade information, when available, is flagged for availability to notify the user and allow the user to download and install the upgrade information if it is so desired. The preferred embodiment of the present invention is directed toward a system that monitors the availability of updates in the background and notifies the user of such available updates only when computer information is accessed by the user for which an update is available.

It will be appreciated by those of ordinary skill in the art that the present invention can be embodied in other specific forms without departing from the spirit or essential characteristics thereof. For example, the invention has been described in the context of help files upgraded via the Internet, in which an upgrade availability is automatically monitored when a connection to the Internet is established, and a user is notified when the computer information to which the upgrade pertains is accessed, allowing the user to decide whether or not to download or install any available upgrades. The particular type of computer information to be upgraded is not critical to the operation of the present invention, nor is the type of network over which upgrade information is communicated. Alternatively, the system of the present invention could be implemented within a LAN, WAN, or other type of network, as an alternative to the Internet. Additionally, the type of computer information for which upgrades are monitored and downloaded can include any type of computer information, including but not limited to: computer programs, executable computer programs, compiled computer programs, computer applications, byte-code computer programs, computer software, operating system software, computer documents, computer files, computer databases, and computer books.

The presently disclosed embodiments are therefore considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A system for monitoring and notifying a user of updated computer information on a remote server available for the user to upgrade computer information on the user's computer, comprising:
   a monitoring component on the user's computer that automatically determines, in response to a predefined event, if one or more upgrades exist for computer information currently on said user's computer, and sets a notification flag at said user's computer in association with each item of information on the user's computer for which an upgrade exists;
   a notification component that automatically notifies said user, in response to subsequent access by the user of an item of computer information for which a notification flag has been set, of the availability of the upgrade for the accessed computer information and of any other upgrades indicated by any other notification flags set by said monitoring component; and
   a downloading component that allows a user to selectively download said upgrades from said remote server.

2. The system of claim 1, further comprising:
   an installation component operable to install said upgrades downloaded from said remote server.

3. The system of claim 2, wherein said installation component utilizes the installation capabilities of an outside executable computer program for installing said upgrades.

4. The system of claim 2, wherein said installation component accompanies the downloaded upgrade information.

5. The system of claim 1, wherein the monitoring component operates as a background process.

6. The system of claim 1, wherein the monitoring component determines at least one of: a file size, file version number, file date, or estimated download time, concerning available upgrades.

7. The system of claim 1, wherein said notification component provides the user with an option to ignore available upgrades permanently.

8. The system of claim 7, wherein said option is a user-determined option.

9. The system of claim 8, wherein said user-determined option is controlled by a menu option from a pull-down menu.

10. The system of claim 1, further comprising:
    a monitoring wait period indication component for indicating a waiting period, after said monitoring component determines the availability of upgrades, to expire before said monitoring component is employed again.

11. The system of claim 10, wherein said monitoring wait period indication component is controlled by a user-determined option.

12. The system of claim 11, wherein said user-determined option is controlled by a menu option from a pull-down menu.

13. The system of claim 1, further comprising:
    a notification wait period component for setting a waiting period, after a user has declined downloading an upgrade for which a notification flag has been set, and of which the user has been notified, before further notifying a user of the availability of said upgrade for which the notification flag has been set.

14. The system of claim 13, wherein said notification wait period component is controlled by a user-determined option.

15. The system of claim 14, wherein said user-determined option is controlled by a menu option from a pull-down menu.

16. The system of claim 1, further comprising:
    an override component operable to override the normal functions of the monitoring or notification components.

17. The system of claim 16, wherein said override component allows the user to check for available upgrades immediately, ignore available upgrades or download all updates without notification.

18. The system of claim 1, wherein said notification component notifies the user of at least one of: file size, file version number, file date, or estimated download time.

19. The system of claim 1, wherein said downloading component is further operable to allow downloads of multiple files.

20. The system of claim 1, wherein said downloading component is further operable to display real-time downloading options.

21. The system of claim 1, wherein said computer information is information associated with a help system.

22. The system of claim 1, wherein said information upgrades further comprise predetermined location information, used to determine the location of future upgrades.

23. The system of claim 1, wherein the system is a component of an operating system.

24. The system of claim 1, wherein said predefined event is connection of the user's computer to a network that provides access to said remote computer.

25. The system of claim 1, wherein said predefined event is starting a computer program.

26. The system of claim 20, wherein said downloading options are selected from the group consisting of: download statistics, download time, and file identification information.

27. A system for monitoring and notifying a user of updated computer information on a remote server available for the user to upgrade computer information on the user's computer, comprising:
a monitoring means that operates as a background process on the user's computer to automatically determine if one or more upgrades exist for computer information currently on said user's computer in response to a predefined event, and set a notification flag at said user's computer in association with each item of information on the user's computer for which an upgrade exists;
a notification means that automatically notifies said user, in response to subsequent access by the user of computer information for which a notification flag has been set, of the availability of the upgrade for the accessed computer information and any other upgrades indicated by any other notification flags set by said monitoring component; and
a downloading means for downloading said upgrades from said remote server.

28. The system of claim 27, further comprising:
an installation means operable to install said upgrades downloaded from said remote server.

29. The system of claim 28, wherein said installation means utilizes the installation capabilities of an outside executable computer program for installing said upgrades.

30. The system of claim 28, wherein said installation means installs upgrades using internal system functionality.

31. The system of claim 27, wherein the monitoring means determines at least one of: a file size, file version number, file date, or estimated download time, concerning available upgrades.

32. The system of claim 27, wherein said notification component provides the user with an option to ignore available upgrades permanently.

33. The system of claim 32, wherein said option is a user-determined option.

34. The system of claim 33, wherein said user-determined option is controlled by a menu option from a pull-down menu.

35. The system of claim 27, further comprising:
a monitoring wait period indication means for indicating a waiting period, after said monitoring means determines the availability of upgrades, to expire before said monitoring means is employed again.

36. The system of claim 35, wherein said monitoring wait period indication means is controlled by a user-determined option.

37. The system of claim 36, wherein said user-determined option is controlled by a menu option from a pull-down menu.

38. The system of claim 27, further comprising:
a notification wait period means for setting a waiting period, after a user has declined downloading an upgrade for which a notification flag has been set, and of which the user has been notified, before further notifying a user of the availability of said upgrade for which the notification flag has been set.

39. The system of claim 38, wherein said notification wait period means is controlled by a user-determined option.

40. The system of claim 39, wherein said user-determined option is controlled by a menu option from a pull-down menu.

41. The system of claim 40, further comprising:
an override means, operable to override the normal functions of the monitoring or notification means.

42. The system of claim 41, wherein said override means allows the user to check for available upgrades immediately, ignore available upgrades or download all updates without notification.

43. The system of claim 27, wherein said notification means notifies the user of at least one of: file size, file version number, file date, or estimated download time.

44. The system of claim 27, wherein said downloading means is further operable to allow downloads of multiple files.

45. The system of claim 27, wherein said downloading means is further operable to display real-time downloading options.

46. The system of claim 27, wherein said downloading options are selected from the group consisting of: download statistics, download time, and file identification information.

47. The system of claim 27, wherein said computer information is information associated with a help system.

48. The system of claim 27, wherein said information upgrades further comprise predetermined location information, used to determine the location of future upgrades.

49. The system of claim 27, wherein the system is a component of an operating system.

50. The system of claim 27, wherein said predefined event is connection of the user's computer to a network that provides access to said remote computer.

51. The system of claim 27, wherein said predefined event is starting a computer program.

52. A method for notification and download of computer information upgrades to a user's computer from a computer network, comprising the steps of:
automatically checking a predetermined location for availability of computer information upgrades in response to a predefined event;
determining if any available computer information upgrades exist;
setting a flag at the user's computer indicating each item of computer information on the user's computer for which upgrades exist;
automatically notifying a user, in response to user access of computer information for which a flag has been set, of available computer information upgrades for the accessed computer information and for any other computer information upgrades which have a flag set; and
selectively downloading said available computer information upgrade.

53. The method of claim 52, wherein said step of automatically checking takes place as a background process.

54. The method of claim 52, wherein said step of checking determines one of: file size, file version number, file date, or estimated download time of an available upgrade.

55. The method of claim 53, wherein said step of checking occurs at pre-set time intervals.

56. The method of claim 55, wherein said pre-set time intervals are determined by a user.

57. The method of claim 52, wherein said predefined event comprises starting a computer program.

58. The method of claim 52, wherein said predefined event comprises connection to said computer network.

59. The method of claim 58, wherein said computer network comprises the Internet.

60. The method of claim 52, wherein said information upgrades further comprise predetermined location information, used to determine the location of future upgrades.

61. The method of claim 60, wherein the predetermined location that is checked is updated responsive to said predetermined location information downloaded by said step of selectively downloading.

62. The method of claim 52, wherein said computer network comprises the Internet.

63. The method of claim 52, wherein said step of selectively downloading takes place in response to a user command.

64. The method of claim 52, where said computer information is information associated with a help system.

65. A computer-readable medium containing a program that performs the following steps on a local computer:
- automatically checking for availability, on a remote computer connected via a computer network, of computer information upgrades to information on the local computer;
- determining if any available computer information upgrades exist on said remote computer;
- setting a flag indicating the availability of computer information upgrades;
- automatically notifying a user, in response to access by a user of computer information for which an upgrade has been determined to be available, of available computer information upgrades for the accessed computer information and for any other computer information upgrades which have a flag set; and
- downloading said available computer information upgrades in response to user selection of said upgrades.

66. The computer-readable medium of claim 65, wherein the computer information is information associated with a help system.

67. The computer-readable medium of claim 65, wherein said information upgrades further comprise predetermined location information, used to determine the location of future upgrades.

68. A method for providing a computer user with notification of the availability of an upgrade for a software component on the user's computer, comprising the steps of:
- retrieving from said software component the identification of a resource on a network at which an upgrade is made available;
- checking said resource to determine whether an upgrade is available;
- setting a flag at the user's computer to indicate that an upgrade is available for the software component; and
- upon detecting access of the software component by a user, determining whether said flag is set and, if so, displaying a notification that an upgrade is available for the software component,
- wherein a plurality of software components are resident on the user's computer, and wherein:
- said checking step is performed for each of said plurality of software components;
- a flag is set for each software component for which an upgrade is available; and
- a notification is displayed that identifies each software component for which a flag is set when any one of said software components, for which a flag is set, is accessed by a user.

* * * * *